United States Patent [19]
Fujioka et al.

[11] Patent Number: 4,631,459
[45] Date of Patent: Dec. 23, 1986

[54] BRUSHLESS DC MOTOR

[75] Inventors: Souichirou Fujioka, Sakai; Toshio Inaji, Mino; Susumu Yamamoto, Takatsuki, all of Japan

[73] Assignee: Matsushita Electric Industrial Co., Ltd., Kadoma, Japan

[21] Appl. No.: 804,253

[22] Filed: Dec. 3, 1985

[30] Foreign Application Priority Data

Dec. 25, 1984 [JP] Japan .............................. 59-277165
Jul. 2, 1985 [JP] Japan .............................. 60-145586
Sep. 30, 1985 [JP] Japan .............................. 60-217013

[51] Int. Cl.$^4$ ............................................. H02P 6/02
[52] U.S. Cl. .................................. 318/254; 318/138; 318/439
[58] Field of Search ................... 318/138, 254 A, 254, 318/439

[56] References Cited

U.S. PATENT DOCUMENTS 4,292,575 9/1981 Kuhnlein et al. ............... 318/254 A

FOREIGN PATENT DOCUMENTS 56-46680 4/1981 Japan .................................. 318/254

Primary Examiner—William M. Shoop, Jr.
Assistant Examiner—Bentsu Ro
Attorney, Agent, or Firm—Wenderoth, Lind & Ponack

[57] ABSTRACT

A brushless DC motor which can be started positively by using a single position detecting element. The motor has a starting circuit which forcibly energizes the stator coils thereby to start rotating the rotor. The position detecting element produces n position signals corresponding to n positions of the rotor at which a specific stator coil is to be energized. When the position detecting element produces one of the n position signals, the motor begins to energize the stator coils according to position signals obtained from counter electromotive forces generated in the stator coils. Further, one of the n position signals produced by the position detecting element is made different from the other, a reference position signal can be obtained.

17 Claims, 6 Drawing Figures

BRUSHLESS DC MOTOR

BACKGROUND OF THE INVENTION

1. Field of the Invention

The present invention relates to a brushless DC motor, and more particularly to a brushless DC motor which does not employ a special position detecting means to obtain a rotating position signal for switching an excited phase during a normal rotation.

2. Description of the Prior Art

Brushless DC motors have been used in video tape recorders (VTRs) for driving the rotary head. In the conventional brushless DC motor for driving the rotary head of VTR, since the excited phase of stator coils is switched according to the rotation of the rotor, a plurality of special position detecting means such as the Hall elements are provided to detect a rotor position, and furthermore, another position detecting means is provided to detect a standard rotating position of the rotor so that the rotary head mounted on the rotor can scan specified positions on a magnetic tape. However, use of such position detecting means is one of the obstacles to reduce cost and size of the motor.

Therefore, some brushless DC motors which do not use the position detecting means have been proposed. In these brushless DC motors, some processes are provided to obtain the rotating position signal for switching the excited phase of the stator coils by detecting the counter electromotive forces generated in the stator coils. Since the counter electromotive force is used to obtain the rotating position signal, the rotating position signal cannot be obtained when the rotor is not rotating. Therefore, when starting the motor, a specific stator coil is energized for positioning the rotor thereby to detect a starting position. This technique is disclosed, for example, in the Japanese Laid-Open Patent Application No. 55-160980.

However, in such brushless DC motors, when positioning the rotor at starting, certain time is required until the permanent magnet rotor comes to a standstill at a desired position because the rotor vibrates about the desired position. The time required for the permanent magnet rotor to become stationary varies considerably with the load or the inertia of the rotor, and is fairly long particularly when the inertia of the rotor is large. Furthermore, if the rotor is in a position apart by 180° from the desired position where the rotor is to be positioned, the rotor cannot rotate unless no disturbance is caused, resulting in failure of starting.

SUMMARY OF THE INVENTION

An object of the present invention is to provide a brushless DC motor which can be positively started by using only one position detecting element.

Another object of the present invention is to provide a brushless DC motor which is capable of producing a reference position signal which is used in an apparatus (such as VTR) in which the motor is equipped.

The brushless DC motor according to the present invention energizes forcibly and sequentially a plurality of stator coils at a starting time to start the permanent magnet rotor. When a phase switching position for a specific stator coil is detected by the single position detecting element (such as Hall element), the specific stator coil is energized, and, from this point, counter electromotive forces generated in stator coils begin to be detected to obtain rotating position signals so that the stator coils are thereafter energized in response to the rotating position signals.

In one full rotation (i.e. 360°) of the rotor, the position detecting element generates a plurality of position signals as pulse signals having same pulse width for indicating positions (phase switching positions) where the specific stator coil should be energized. It is preferable, however, to construct the motor so that the position detecting element does not generate one of the plurality of position signals or that the position detecting element generates, as one of the plurality of position signals, a signal which has a pulse width narrower than that of the other of the plurality of position signals. If constructed in this manner, the position where the position signal is missed or the position signal having narrower pulse width can be identified by logically processing the plurality of position signals thereby to obtain a reference position signal in each full rotation of the rotor.

It is further preferable to reduce electromagnetic noise by reducing a driving current at each switching timing of the excited phase when forcibly energizing a plurality of stator coils sequentially at starting so that driving transistors operate within their safe operating ranges.

The brushless DC motor according to the present invention basically comprises: a permanent magnet rotor magnetized to have 2n poles (n is a positive integer); a plurality of stator coils mounted on a stator; a position detecting arithmetic circuit to obtain a rotating position signal of the permanent magnet rotor by processing a counter electromotive force generated in each of the plurality of stator coils; a coil driving circuit to energize said plurality of stator coils; a starting circuit to cause said permanent magnet rotor to rotate by controlling the coil driving circuit to forcibly and sequentially energize the stator coils during starting; a position detecting means to detect at least one specific rotating position of the rotor; and a driving status switching circuit to allow the coil driving circuit to be responsive to an output signal of the starting circuit until the position detecting means detects the specific rotating position, and to an output signal of the position detecting arithmetic circuit after the position detecting means detects the specific rotating position.

The above and other objects, features and advantages of the invention will be apparent from the following description taken in connection with the accompanying drawings in which:

DESCRIPTION OF THE PREFERRED EMBODIMENTS

For the purpose of an explanation, an example using a permanent magnet rotor magnetized to have six poles (n=3) will be described but it should be noted that the rotor is not limited to one referred to herein.

Figure 1:
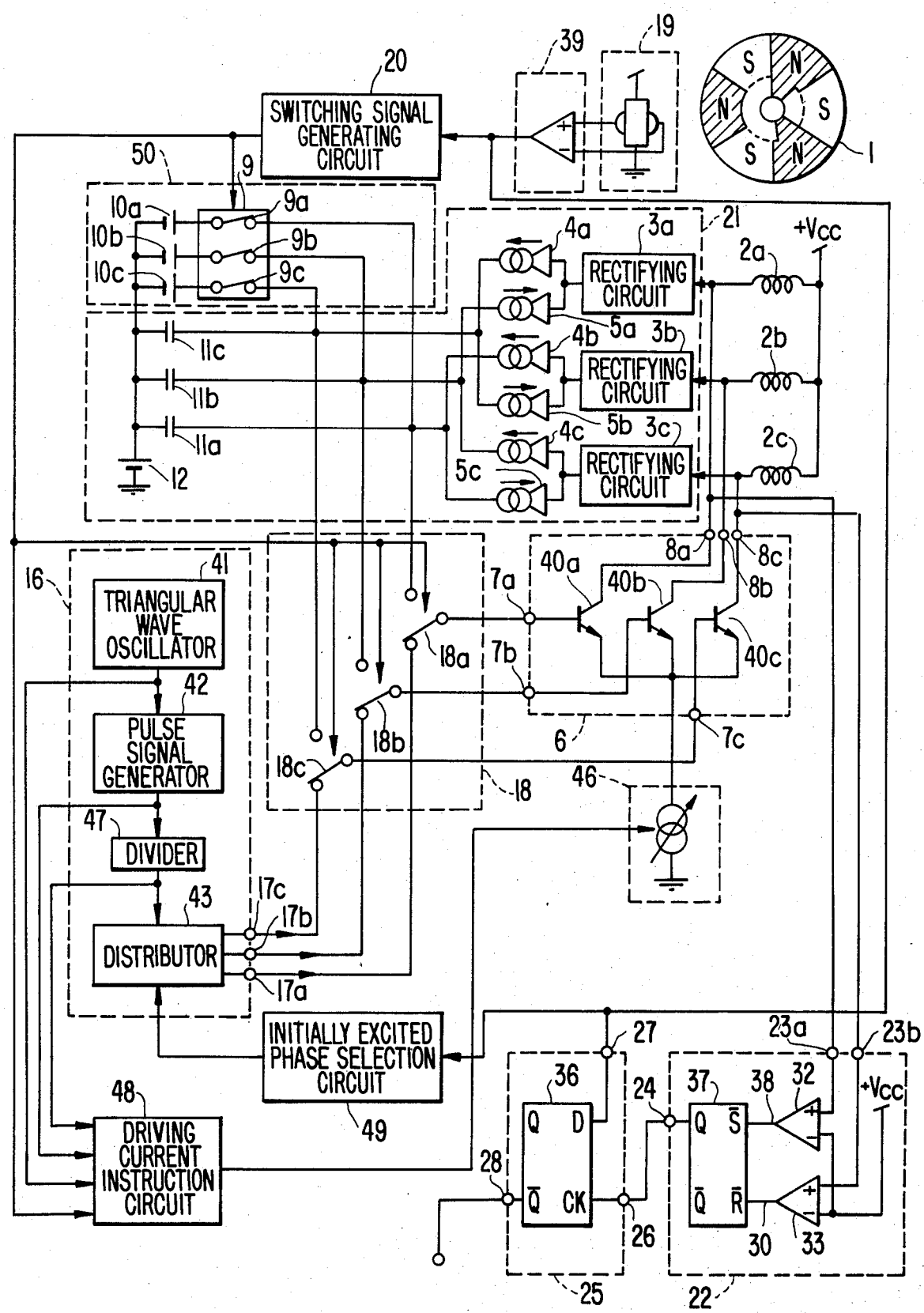
FIG. 1 is a circuit diagram showing an embodiment of brushless DC motor according to the present invention.

Referring to FIG. 1, 1 is a permanent magnet rotor having six poles, in which each N pole has a specific shape at a portion on the inner circumference of the rotor to be detected by a position detecting element to obtain a rotating position of the rotor, which will be described in detail later. Needless to say, the magnetization for the detection of the rotating position is not limited only to the portion on the inner circumference of the permanent magnet rotor 1.

Reference numbers 2a, 2b and 2c are stator coils.

Reference number 6 is a coil driving circuit connected at input terminals 7a, 7b and 7c respectively with common terminals of switches 18a, 18b and 18c constituting a driving status switching circuit 18, and at output terminals 8a, 8b and 8c respectively with the stator coils 2a, 2b and 2c.

The coil driving circuit 6 is responsive to the largest on of input voltages applied to the input terminals 7a, 7b and 7c. The coil driving circuit 6 energizes, when a voltage at 7a is the largest, the stator coil 2a via 8a; when a voltage at 7b is the largest, the stator coil 2b via 8b; and when a voltage at 7c is the largest, the stator coil 2c via 8c. The circuit 6 is composed, for example, of driving transistors 40a, 40b and 40c as shown in FIG. 1.

Reference numeral 16 is a starting circuit which generates periodically repeating signals at output terminals 17a, 17b and 17c which are respectively connected to the input terminals 7a, 7b and 7c of the coil driving circuit 6 via the change-over switches 18a, 18b and 18c of the switching circuit 18 at starting, thereby to forcibly energize the stator coils 2a, 2b and 2c sequentially.

Reference numeral 41 is a triangular wave oscillator to generate triangular wave signals, 42 is a pulse signal generator to generate pulse signals synchronized with the triangular wave signals from the triangular wave oscillator 41, 47 is a divider to divide the pulse signals from the pulse signal generator 42, and 43 is a distributor to distribute the divided pulse signals from the divider 47.

Reference numeral 21 is a position detecting arithmetic circuit which processes counter electromotive forces generated in the stator coils 2a, 2b and 2c to obtain rotating position signals of the permanent magnet rotor 1, and is connected to the input terminals 7a, 7b and 7c of the coil driving circuit 6 via the change-over switches 18a, 18b and 18c of the switching circuit 18 during the steady-state rotation of the rotor for sequentially energizing the stator coils 2a, 2b and 2c. Reference numerals 3a, 3b and 3c are rectifying circuits to respectively extract non-energized areas (upper area greater than a power supply voltage +Vcc, in this case) of the counter electromotive forces generated in the stator coils 2a, 2b and 2c. Reference numerals 4a, 4b and 4c are discharge-type voltage-current conversion circuits which respectively convert half waveform counter electromotive forces obtained respectively by the rectifying circuits 3a, 3b and 3c into currents, 5a, 5b and 5c are attraction-type voltage-current conversion circuits which respectively convert the half waveform counter electromotive forces obtain respectively by the rectifying circuits 3a, 3b and 3c into currents, and 11a, 11b and 11c are integrating capacitors which are charged respectively by the voltage-current conversion circuits 4b, 4c and 4a, and discharged respectively by the voltage-current conversion circuits 5c, and 5a and 5b. A bias power source 12 provides a proper DC bias voltage.

Reference numeral 50 is an initial value setting circuit, in which DC power sources 10a, 10b and 10c respectively provide voltage Ea, Eb and Ec, as initial values, for the integrating capacitors 11a, 11b and 11c through transfer switches 9a, 9b and 9c of a switching circuit 9 at starting. Here, voltage Ec is set greater than voltages Ea and Eb.

Hereinafter, a status wherein the stator coils 2a, 2b and 2c are driven by the output signals of the starting circuit 16 will be called an "externally synchronized status", and a status wherein the stator coils 2a, 2b and 2c are driven by the output signals of the position detecting arithmetic circuit 21 will be called a "position detecting status".

Each energized phase in the externally synchronized status is the same as that of a synchronous motor and is different from that of a DC motor, namely, the energized phase in the position detecting status. In other words, in the externally synchronized status, the current is supplied partly even to the non-energized area of the counter electromotive force waveform used to obtain the rotating position signals in the position detecting status. Therefore, without proper measures, it is extremely difficult to change from the externally synchronized status to the position detecting status.

Reference numeral 19 is a position detecting element such as a Hall element. The position detecting element 19 is disposed opposed to the inner circumference of the permanent magnet rotor 1 to detect positions corresponding to the phases of rotating position signals for energizing a specific stator coil (here, the stator coil 2c).

Reference numeral 39 is a waveform shaping circuit to shape the waveform of an output signal of the position detecting element 19, and may comprises a comparator for example.

Reference numeral 20 is a switching signal generating circuit which is responsive to the output signal of the position detecting element 19 to generate a driving status switching signal which is applied to the switching circuits 9 and 18 for switching the status of the motor from the externally synchronized status to the position detecting status.

Reference numeral 46 is a driving current control circuit which may be a constant current source for example, and is connected in common with the emitters of the driving transistors 40a, 40b and 40c to control the driving current.

In the externally synchronized status at starting, the transfer switches 9a, 9b and 9c are closed so that initial values Ea, Eb and Ec are transferred to the integrating capacitors 11a, 11b and 11c, and the change-over switches 18a, 18b and 18c are in the state turned to the output terminals 17a, 17b and 17c of the starting circuit so that the stator coils 2a, 2b and 2c are forcibly and sequentially energized to rotate the permanent magnet rotor 1. When the position detecting element 19 detects a rotating position of the rotor 1 corresponding to rotating position signal according to which the stator coil 2c is to be energized and generates a position signal, the switching signal generating circuit 20 responsive to the position signal generates a driving status switching signal which may be a differential of the position signal. Then, the transfer switches 9a, 9b and 9c are opened in response to the driving status switching signal, and the change-over switches 18a, 18b and 18c are changed over respectively to the integrating capacitors 11a, 11b and 11c in response to the driving status switching signal. Since the initial values Ea, Eb and Ec are given to the integrating capacitors 11a, 11b and 11c and Ec is greater than Ea and Eb, the coil driving circuit 6 supply a driving current through the output terminal 8c to the stator coil 2c.

As the result, the permanent magnet rotor 1 is accelerated in the position detecting status, in which the position detecting arithmetic circuit 21 detects counter electromotive forces of the stator coils and produces rotating position signals, and the coil driving circuit 6 sequentially energizes the stator coils 2a, 2b and 2c according to the rotation position signals, so that the rotor 1 continues to rotate.

Now, the position detecting arithmetic circuit 21 will be explained in detail with reference to FIG. 2.

Figure 2:
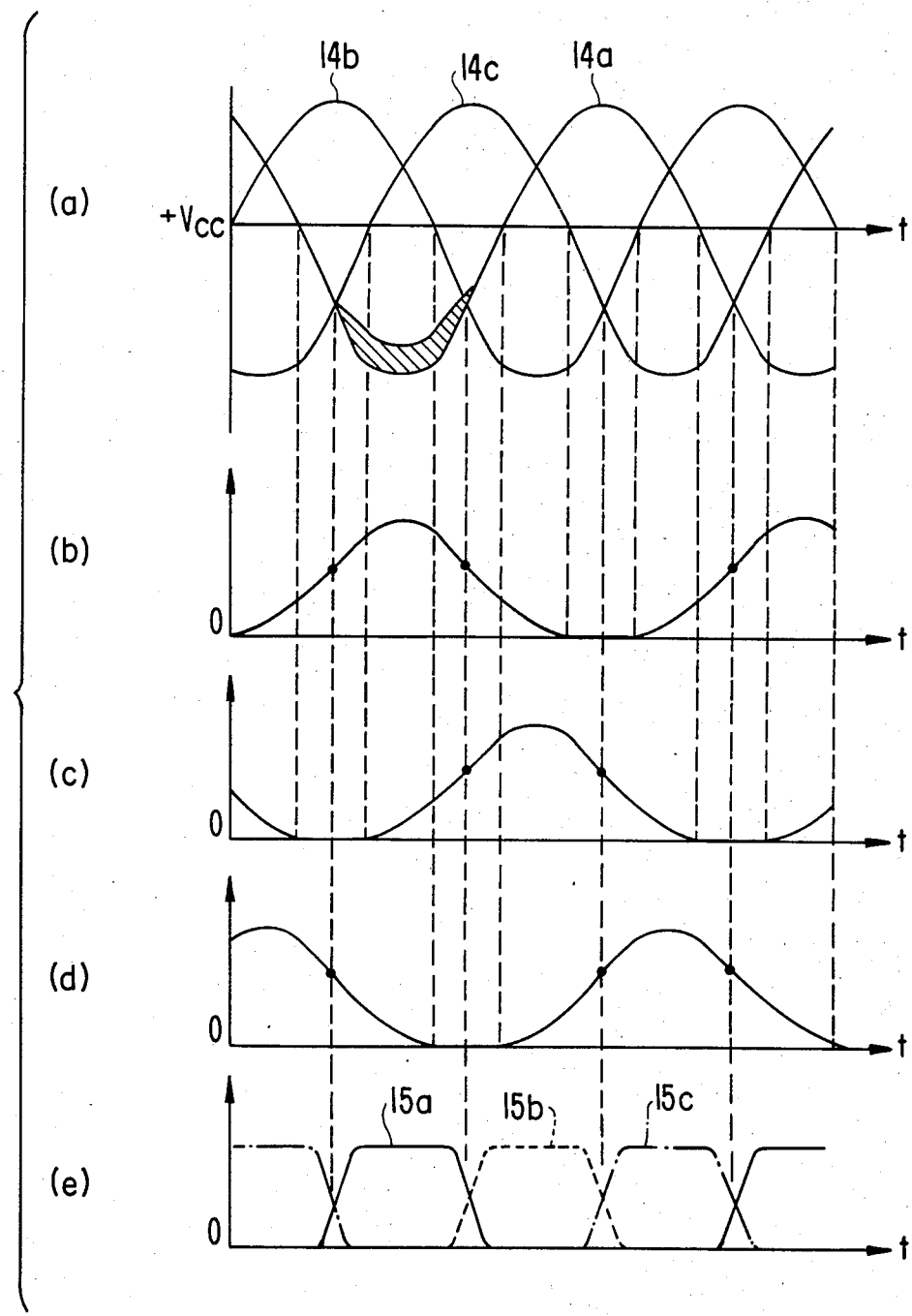
FIG. 2 is a waveform chart to explain a position detecting arithmetic circuit used in the motor shown in FIG. 1.

In FIG. 2 (a), 14a, 14b and 14c respectively represent voltages across the stator coils 2a, 2b and 2c during the steady-state rotation. In each of these, the portions above the +Vcc level are the waveform of the counter electromotive force generated in the respective stator coil by the rotation of the permanent magnet rotor, while in the portions below the +Vcc level the voltage drop caused by the coil driving current and coil resistance is observed (shaded portion) in addition to the counter electromotive force.

FIG. 2 (b) shows a voltage waveform at the integrating capacitor 11a, which becomes a rotating position signal for driving the stator coil 2a. The position signal shown in FIG. 2 (b) is obtained as follows by the position detecting arithmetic circuit 21.

That is, in FIG. 1, the voltage 14b of the stator coil 2b is rectified by the rectifying circuit 3b to be a half-wave voltage which is the portion above the +Vcc. The half-wave voltage is converted into a current by the voltage-current conversion circuit 4b to charge the integrating capacitor 11a. Further, the voltage 14c of the stator coil 2c is rectified by the rectifying circuit 3c to be a half-wave voltage above the +Vcc level, and then converted into a current by the voltage-current conversion circuit 5c to thereby discharge the integrating capacitor 11a. Thus, the voltage waveform as shown in FIG. 2 (b) is obtained.

Likewise, FIG. 2 (c) shows a voltage waveform at the integrating capacitor 11b, which becomes a rotating position signal for driving the stator coil 2b. FIG. 2 (d) shows a voltage waveform at the integrating capacitor 11c, which becomes a rotating position signal for driving the stator coil 2c. FIG. 2 (e) shows currents flowing through the stator coils 2a, 2b and 2c according to the position signals respectively shown in (b), (c) and (d) in FIG. 2, and 15a, 15b and 15c respectively show the currents flowing through the stator coils 2a, 2b and 2c.

Next, phases of the rotating positions detected by the position detecting element 19 will be explained in detail with reference to FIG. 3 and FIG. 4.

Figure 3:
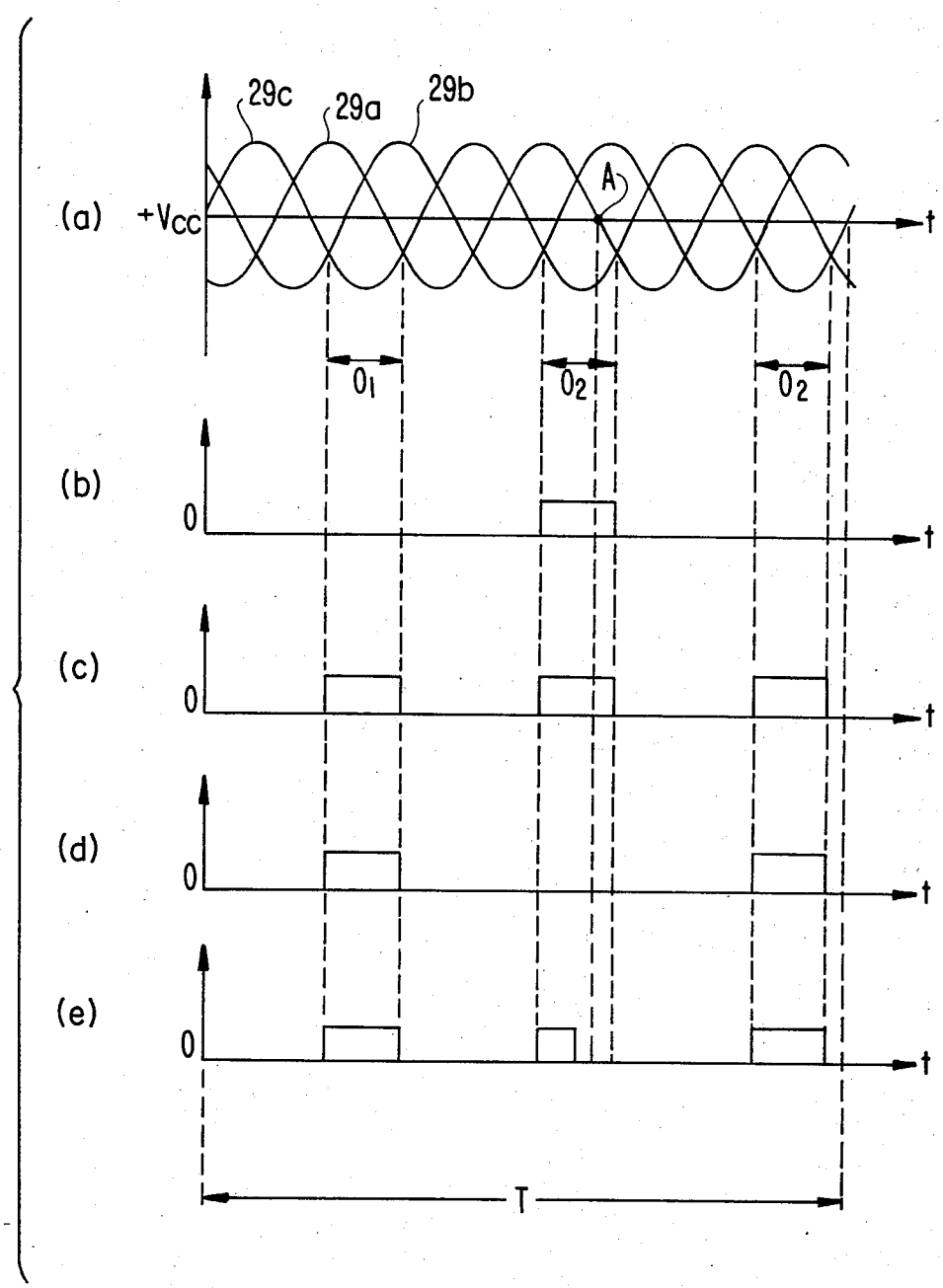
FIG. 3 is a waveform chart to explain phases of rotating positions to be detected by a position detecting means used in the motor shown in FIG. 1.
Figure 4A:
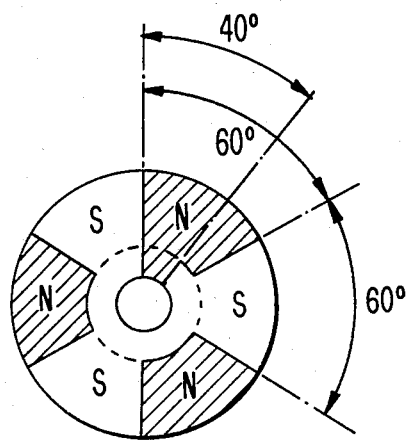
FIG. 4 is an illustrative chart showing some magnetized patterns of a permanent magnet rotor used in the motor shown in FIG. 1.
Figure 4B:
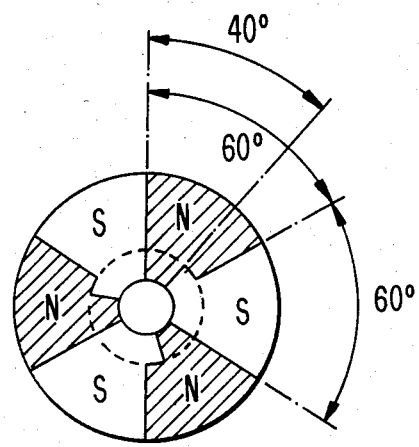
Figure 4C:
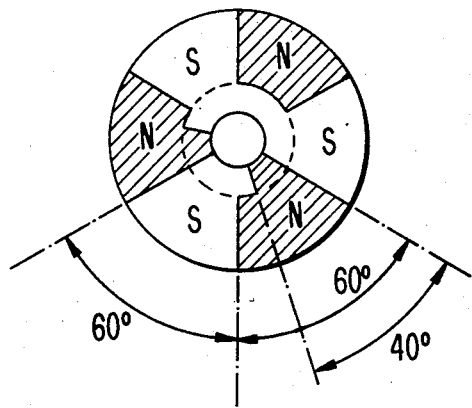
Figure 4D:
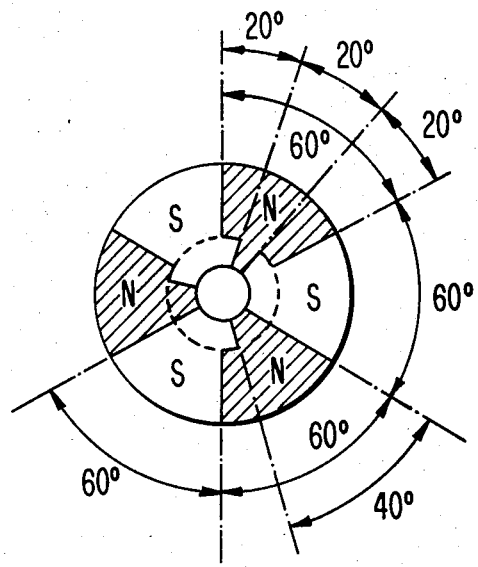

FIG. 3 (a) shows the waveforms of the counter electromotive forces generated in the stator coils when the brushless DC motor is rotating at a constant speed, wherein 29a, 29b and 29c show the counter electromotive forces respectively of the stator coils 2a, 2b and 2c. T represents a period in which the permanent magnet rotor 1 makes one mechanical rotation.

FIG. 3 (b), (c), (d) and (e) represent signal waveforms obtained by shaping waveforms of the output signals of the position detecting element 19 with respect to respective cases of the magnetized patterns of the rotor 1 which are shown in FIG. 4 (a), (b), (c) and (d), respectively.

The position detecting element 19 detects positions corresponding to the phases of the rotating position signals for the stator coil 2c. The positions corresponding to the phases of the rotating position signals for the stator coil 2c are $\theta 1$, $\theta 2$ and $\theta 3$ shown in the FIG. 3. Apparatuses such as VTRs using motors often require a reference position signal indicating a reference position of a rotation of the motor for controlling the motor operation. From the view point of obtaining the reference position signal by using a single position detecting element, the position detecting element should detect only one of the positions $\theta 1$, $\theta 2$ and $\theta 3$ as shown in FIG. 3 (b). On the other hand, from the viewpoint of the starting characteristic of the motor, it is desirable that the position detecting element detects all of the three positions $\theta 1$, $\theta 2$ and $\theta 3$ as shown in FIG. 3 (c).

Therefore, to meet the above two exclusive requirements, such method can be adopted that two of the three positions $\theta 1$, $\theta 2$ and $\theta 3$ are detected by the position detecting means 19 with the normal width, and the remaining one position is not detected as shown in FIG. 3 (d) or is detected with a width narrower than the normal width as shown in FIG. 3 (e). In the case of FIG. 3 (d), the narrower width means that the pulse ends before a time (point A in FIG. 3 (a)) where the voltage 29a changes from the higher level than the +Vcc level to the lower level. The reference position signal can be obtained by logically processing the signal shown in FIG. 3 (d) or (e) generated by the position detecting element 19.

FIG. 4 (a), (b), (c) and (d) show magnetization patterns of the permanent magnet rotor 1 for detecting positions corresponding to those shown in FIG. 3 (b), (c), (d) and (e), respectively. The position detecting element 19 is provided at a suitable position opposing the inner circumference of the rotor 1. The pulse signals having the phases as shown in FIG. 3 (b), (c), (d) and (e) can be obtained by passing the output signal of the position detecting element 19 through the waveform shaping circuit 39.

Referring again to FIG. 1, 22 is a pulse signal generating circuit which detects at least one of the counter electromotive forces generated in the stator coils (stator coils 2a, 2c here), and produces pulse signals, where 23a and 23c are input terminals and 24 is an output terminal.

Reference numeral 25 is a reference position detecting circuit which is applied at an input terminal 26 with the output pulse signals of the pulse signal generating circuit 22 and at an input terminal 27 with the output signal of the waveform shaping circuit 39, and logically processes these input signals to produce the reference position signal in each full rotation of the permanent magnet rotor 1 at an output terminal 28.

In the pulse signal generating circuit 22, a comparator 32 is applied at its inverting input terminal with the counter electromotive force generated in the stator coil 2a and at its non-inverting input terminal with a reference voltage (+Vcc in this case), and generates a pulse signal at an output terminal 38 when the voltage applied to the inverting input terminal exceeds the +Vcc level.

A comparator 32 is applied at its inverting input terminal with the counter electromotive force generated in the stator coil 2c and at its non-inverting input terminal with the reference voltage (+Vcc in this case), and generates a pulse signal at an output terminal 30 when voltage applied to the inverting input terminal exceeds the +Vcc level. A RS flip-flop 37 applied at its set ($\overline{S}$) and reset ($\overline{R}$) terminals with the output pulses of the comparators 32 and 33 respectively produces a pulse signal at its Q terminal. A D flip-flop 36 is applied at its clock input terminal (CK) with the output pulse of the pulse signal generating circuit 22 and at its D input terminal with the output pulse of the waveform shaping circuit 39, and outputs the D input status from its $\overline{Q}$ output terminal in response to the pulse signal applied to the clock input terminal, thereby to obtain the reference position signal per rotation of the permanent magnet rotor 1.

Figure 5:
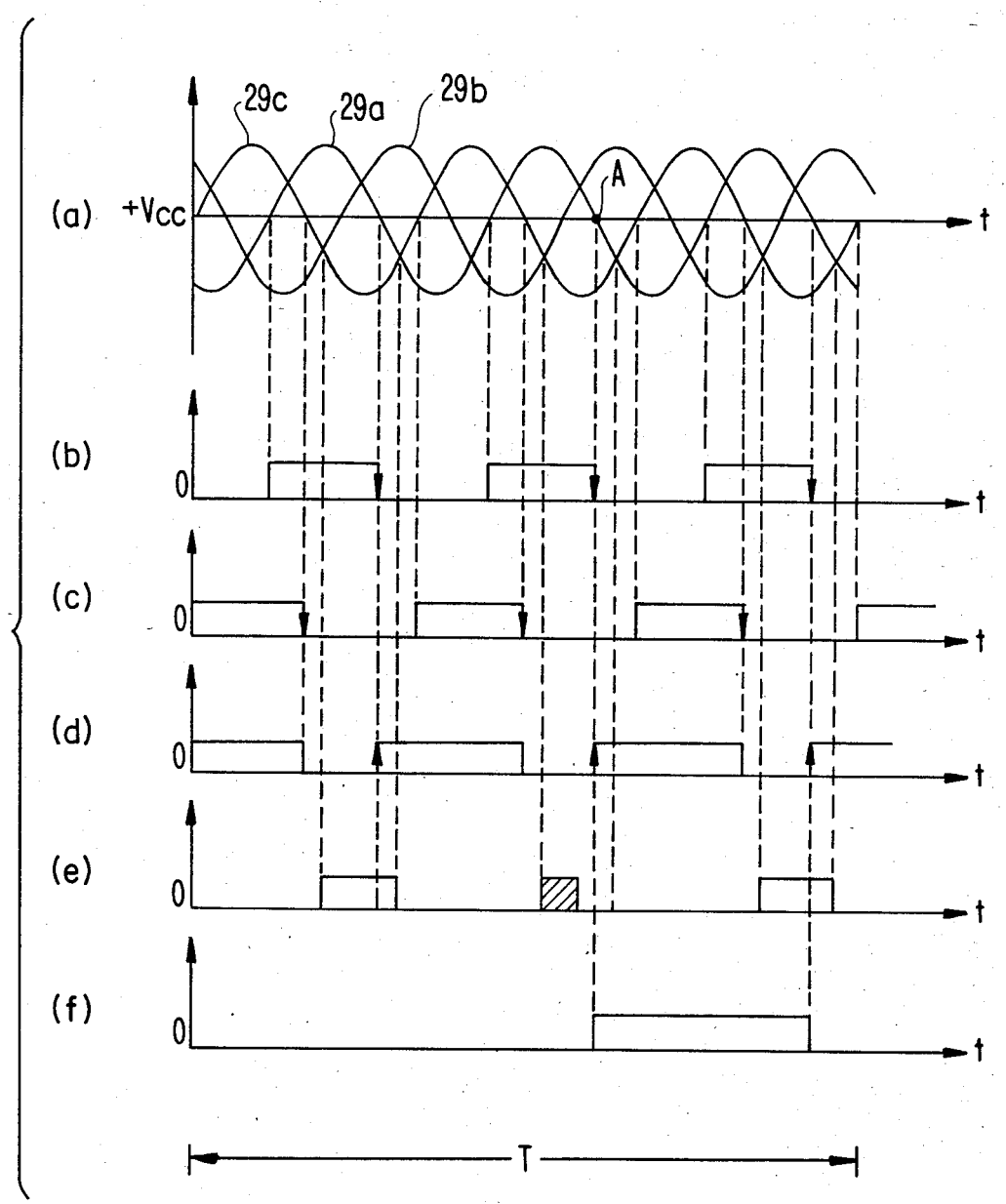
FIG. 5 is a waveform chart to explain a pulse signal generating circuit and a reference position detecting circuit used in the motor shown in FIG. 1.

Now, this operation will be explained with reference to FIG. 5. FIG. 5 (a) shows the waveforms of the counter electromotive forces 29a, 29b and 29c generated in the stator coils 2a, 2b and 2c, which are the same as those shown in FIG. 3 (a). FIG. 5 (b) is the result of processing the waveform of the counter electromotive force 29a generated in the stator coil 2a at the output terminal 38 of the comparator 32. Likewise, FIG. 5 (c) is the result of processing the waveform of the counter electromotive force 29c generated in the stator coil 2c at the output terminal 30 of the comparator 33. By applying the pulse waveforms shown in (b) and (c) respectively to the set and reset input terminals of the RS flip-flop 37, a pulse waveform shown in FIG. 5 (d) is obtained at the terminal 24 in FIG. 1. FIG. 5 (e) is the output waveform of the circuit 39 after shaping the output waveform of the position detecting element 19, which is quite the same as that shown in FIG. 3 (e). If the hatched pulse does not exist, such waveform is one shown in FIG. 3 (d).

FIG. 5 (f) shows a waveform at the $\overline{Q}$ output terminal of the D flip-flop 36. Since the waveform (FIG. 5 (e)) after shaping the output waveform of the position detecting element 19 is applied to the D input terminal (27) of the D flip-flop 36, and the Q output (FIG. 5 (d)) of the RS flip-flop 37 is applied to the clock input terminal (26) of the D flip-flop 36, the signal of FIG. 5 (f) is apparently obtained from the $\overline{Q}$ output terminal (28) of the D flip-flop 36. The signal of FIG. 5(f) is the signal appearing once per each full rotation of the permanent magnet rotor 1 and thus can be used as the reference position signal. The frequency of output signal of the pulse signal generating circuit 22 changes according to the number of rotations the permanent magnet rotor 1, and thus can be used also as a signal for detecting the number of rotations of the motor.

In FIG. 1, the starting circuit 16 sequentially turns on and off the driving transistors 40a, 40b and 40c by the annularly repeating signals to thereby energize forcibly the stator coils 2a, 2b and 2c in sequence. However, since the stator coil, viewed from the driving transistors, is an inductive load, the sudden change of the current of the driving transistor turning from on to off state causes a high voltage appearing between the emitter and collector of the driving transistor, which would damage the driving transistor. Furthermore, the sudden change in the driving current would cause vibration of the motor and electromagnetic noises.

Reference numeral 48 is a driving current instruction circuit which is responsive to the output signal of the switching signal generating circuit 20 and output signals (described below) of the starting circuit 16, and instructs the driving current control circuit 46 to suppress the driving current energized phase at the switching timings in the externally synchronized status.

Figure 6:
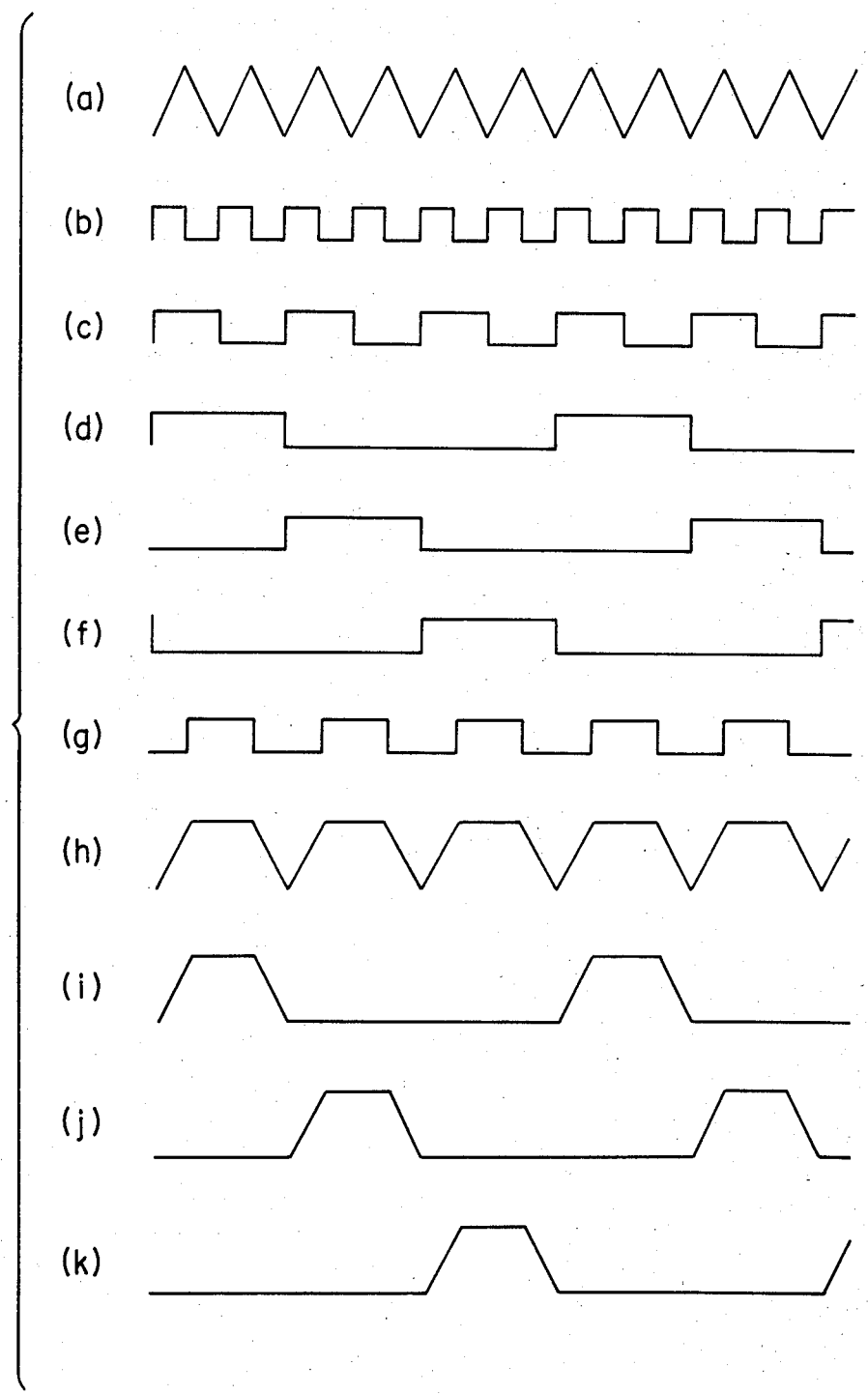
FIG. 6 is a waveform chart to explain a starting circuit and a driving current control circuit used in the motor shown in FIG. 1.

Referring to FIG. 6, (a) shows an output signal of a triangular wave oscillator 41; (b) show an output signal of a pulse signal generator 42 obtained from the signal (a); (c) is an output signal of a divider 47 obtained by dividing the signal (b) (½ division, here); and (d), (e) and (f) are distributed output signals of a divider 47 obtained from the signal (c) and respectively applied to the bases of the driving transistors 4a, 4b and 4c to thereby energize the stator coils 2a, 2b and 2c sequentially.

In the driving current instruction circuit 48, a signal shown in FIG. 6 (g) is obtained by applying the signals of FIG. 6 (b) and (c) to an exclusive (EX)-OR gate circuit. The phase in the "Low" level part of the signal (g) agrees with the timing to switch the excited phase. The signal (g) is modulated by the triangular signal (a) to be an instruction signal as shown in FIG. 6 (h). The driving current control circuit 46 is responsive to this instruction signal so as to supply driving currents as shown in FIG. 6 (i), (j) and (k) respectively to the stator coils 2a, 2b and 2c.

That is, the current flowing through each stator coil during the switching timing of the energized phase changes smoothly to suppress the generation of transient spike voltage caused by the inductance of the stator coil.

Furthermore, 49 is the initially excited phase selection circuit which, when the motor is stopped and the position detecting element 19 is detecting the position corresponding to the rotating position signal for exciting to the stator coil 2c, controls the starting circuit 16 to energize the stator coil 2c in the externally synchronized status, and, when the position detecting means 19 is not detecting the position corresponding to the rotating position signal for exciting the stator coil 2c, controls the starting circuit 16 to energize the other stator coil than the stator coil 2c. For example, the distributor 43 may be composed of a ring counter using flip-flops. It is easily possible to set the initial condition of the ring counter by inputting a proper signal into the set and reset input terminals of the ring counter depending on whether the position detecting element 19 is or is not detecting the position signal at the starting timing of the motor.

It should be understood that the above explanation is merely an example for the understanding of the present invention, and that various changes and modifications are possible without departing from the scope of the present invention.

What is claimed is:

1. A brushless DC motor comprising:
   a permanent magnet rotor magnetized to have 2n poles (n is a positive integer);
   a plurality of stator coils mounted on a stator;
   a position detecting arithmetic circuit for obtaining a rotating position signal of said permanent magnet rotor by processing a counter electromotive force generated in each of said plurality of stator coils;
   a coil driving circuit for energizing said plurality of stator coils;
   a starting circuit for controlling said coil driving circuit to rotate said permanent magnet rotor by forcibly energizing said plurality of stator coils sequentially during a starting of said motor;

a position detecting means composed for detecting at least one specific rotating position of said rotor; and a driving status switching circuit which allows said coil driving circuit to be responsive to an output signal of said starting circuit until said position detecting means detects said specific rotating position, and to an output signal of said position detecting arithmetic circuit after said position detecting means detects said specific rotating position.

2. The brushless DC motor according to claim 1, wherein said position detecting arithmetic circuit comprises a rectifying circuit which takes out whole or a part of non-energized area of said counter electromotive force, a discharge-type voltage-current conversion circuit which converts an signal of said rectifying circuit into a current, an attraction-type voltage-current conversion circuit which converts the output of said rectifying circuit into a current, and an integrating capacitor which is charged and discharged by said discharge-type voltage-current conversion circuit and said attraction-type voltage-current conversion circuit.

3. The brushless DC motor according to claim 1, further comprising an initial value setting circuit for giving an initial value to said position detecting arithmetic circuit at the starting of said motor.

4. The brushless DC motor according to claim 1, wherein said starting circuit comprises a triangular wave oscillator for generating a triangular wave signal, a pulse signal generator for generating a pulse signal from said triangular wave signal, a divider for dividing the pulse signal from said pulse signal generator, and a distributor for obtaining from the divided pulse signal from said divider distributed signals which are applied to said coil driving circuit to sequentially energize said plurality of stator coils.

5. The brushless DC motor according to claim 1, further comprising a driving current control circuit to suppress driving current supplied by said coil driving circuit to said plurality of stator coils when the coil driving circuit changes the excited coil from one to another.

6. The brushless DC motor according to claim 1, further comprising an initially excited phase selection circuit which, when said permanent magnet rotor is stopped and said position detecting means is detecting a specific position at which a specific one of said plurality of stator coils is to be energized, controls said starting circuit to energize said specific one, and, when said position detecting means is not detecting said specific position, controls said starting circuit to energize another of said plurality of stator coils different from said specific one.

7. The brushless DC motor according to claim 1, wherein said position detecting means is so composed as to produce, in each full rotation of said stator, n−1 position signals having same signal width and one position signal having a signal width narrower than that of the n−1 position signals or having no signal width, and wherein said motor further comprises a reference position detecting means which logically processes said position signals to obtain a reference position signal substantially corresponding to said one position signal.

8. A brushless DC motor comprising:
a permanent magnet rotor magnetized to have 2n poles (n is a positive integer);
a plurality of stator coils mounted on a stator;
a position detecting arithmetic circuit for obtaining a rotating position signal of said permanent magnet rotor by processing a counter electromotive force generated in each of said permanent magnet rotor;
a coil driving circuit for supplying driving currents to said plurality of stator coils;
a starting circuit for controlling said coil driving circuit to rotate said permanent magnet rotor by forcibly and sequentially energizing said stator coils during a starting of said motor;
a position detecting means for producing, in each full rotation of said rotor, n position signals corresponding to n position of said rotor at which a specific one coil of said plurality of stator coils is to be energized, one specific position signal of said n position signals having a signal width narrower than that of the other n−1 position signals or being omitted;
a driving status switching circuit which allows said coil driving circuit to be responsive to an output signal of said starting circuit until said position detecting means produces one of said n position signals, and to be responsive to an output signal of said position detecting arithmetic circuit after said position detecting means produces said one of said n position signals;
a pulse signal generating circuit to obtain n pulse signals in each full rotation of said rotor from the counter electromotive force generated in at least one of said plurality of stator coils;
a reference position detecting circuit which produces a reference position signal per rotation of said permanent magnet rotor by logically processing said n pulse signals from said pulse signal generating circuit and said n position signals from said position detecting means.

9. The brushless DC motor according to claim 8, wherein said position detecting arithmetic circuit comprises a rectifying circuit which takes out whole or a part of non-energized area of said counter electromotive force, a discharge-type voltage-current conversion circuit which converts an output signal of said rectifying circuit into a current, an attraction-type voltage-current conversion circuit which converts the output signal of said rectifying circuit into a current, and an integrating capacitor which is charged and discharged by said discharge-type voltage-current conversion circuit and said attraction-type voltage-current conversion circuit.

10. The brushless DC motor according to claim 8, further comprising an initial value setting circuit for giving an initial value to said position detecting arithmetic circuit when said plurality of stator coils are forcibly and sequentially energized by said starting circuit.

11. The brushless DC motor according to claim 8, wherein said starting circuit comprises a triangular wave oscillator for generating a triangular wave signal, a pulse signal generator for generating a pulse signal from said triangular wave signal, a divider for dividing the pulse signal from said pulse signal generator and a distributer for obtaining distributed signals from an output signal of said divider to sequentially energize said plurality of stator coils.

12. The brushless DC motor according to claim 8, further comprising a driving current control circuit to suppress the driving current to be supplied to the stator coils when the coil driving circuit changes the excited coil from one to another.

13. The brushless DC motor according to claim 8, further comprising an initially excited phase selection circuit which, when said permanent magnet rotor is stopped and said position detecting means is producing one of said n position signals, controls said starting circuit to energize said specific coil, and, when said rotor is stopped and said position detecting means is not producing said n position signals, controls said starting circuit to energize another of said plurality of stator coils different from said specific coil.

14. A brushless DC motor comprising:

a permanent magnet rotor magnetized to have 2n poles (n is a positive integer);

a plurality of stator coils mounted on a stator;

a position detecting arithmetic circuit for obtaining rotating position signals of said permanent magnet rotor by processing counter electromotive forces generated respectively in said plurality of stator coils;

a coil driving circuit for energizing said plurality of stator coils;

a starting circuit comprising a triangular wave oscillator generating a triangular wave signal, a pulse signal generator generating a pulse signal from said triangular wave signal, a distributor for obtaining distributed signals to allow said coil driving circuit to sequentially energize said plurality of stator coils during a starting of said motor;

a position detecting means for producing, in each full rotation of said rotor, n position signals corresponding to n positions of said rotor at which a specific one coil of said plurality of stator coils is to be energized, one specific position signal of said n position signals having a signal width narrower than that of the other $n-1$ position signals or being omitted;

a driving status switching circuit which allows said coil driving circuit to be responsive to said distributed signals from said starting circuit until said position detecting means produces one of said n position signals, and to be responsive to an output signal of said position detecting arithmetic circuit after said position detecting means produces said one of said n positive signals;

a driving current control circuit to suppress driving current supplied to said stator coils when said coil driving circuit changes the excited coil from one to another;

a pulse signal generating circuit for producing n pulse signals per rotation of said permanent magnet rotor from at least one of said counter electromotive forces; and a reference position detecting circuit which produces a reference position signal per rotation of said permanent magnet rotor by logically processing said n pulse signals from said pulse signal generating circuit and said n position signals from said position detecting means.

15. The brushless DC motor according to claim 14, wherein said position detecting arithmetic circuit comprises a rectifying circuit which takes out whole or a part of non-energized area of each of said counter electromotive forces, a discharge-type voltage-current conversion circuit which converts an output signal of said rectifying circuit into a current, an attraction-type voltage-current conversion circuit which converts the output signal of said rectifying circuit into a current, and an integrating capacitor which is charged and discharged by said discharge-type voltage-current conversion circuit and said attraction-type voltage-current conversion circuit.

16. The brushless DC motor according to claim 14, further comprising an initial value setting circuit for giving an initial value to said position detecting arithmetic circuit at the starting of said motor.

17. The brushless DC motor according to claim 14, further comprising an initially excited phase selection circuit which, when said permanent magnet rotor is stopped and said position detecting means is producing one of said n position signals, controls said starting circuit to energize said specific coil, and, when said rotor is stopped and said position detecting means is not producing said n position signals, controls said starting circuit to energize another of said plurality of stator coils different from said specific coil.

* * * * *